United States Patent

Hennenhoefer et al.

Patent Number: 5,712,806
Date of Patent: Jan. 27, 1998

[54] OPTIMIZED MULTIPLEXER STRUCTURE FOR EMULATION SYSTEMS

[75] Inventors: Eric Todd Hennenhoefer, Essex Junction; Jonathan Henry Raymond, Underhill, both of Vt.

[73] Assignee: International Business Machines Corporation, Armonk, N.Y.

[21] Appl. No.: 549,992

[22] Filed: Oct. 30, 1995

[51] Int. Cl.[6] .............. G06F 15/00; H03M 7/50
[52] U.S. Cl. .............. 364/578; 395/821; 364/238; 364/716; 341/85; 341/84; 326/105
[58] Field of Search .............. 326/105, 107, 326/108, 39, 41; 364/238, 238.2, 244.9, 716, 578, 580, 748.5; 371/22.2; 395/500, 821; 341/51, 67, 75, 83, 150, 122, 84, 85

[56] References Cited

U.S. PATENT DOCUMENTS

| | | | |
|---|---|---|---|
| 3,609,752 | 9/1971 | Grosser | 341/84 |
| 3,803,392 | 4/1974 | Amdahl et al. | 341/84 |
| 4,025,799 | 5/1977 | Cox et al. | 326/107 |
| 4,208,728 | 6/1980 | Blahut et al. | 326/108 |
| 4,484,268 | 11/1984 | Thoma et al. | 364/238 |
| 4,626,825 | 12/1986 | Burleson et al. | 364/748.5 |
| 4,672,610 | 6/1987 | Salick | 371/22.2 |
| 4,758,985 | 7/1988 | Carter | 364/716 |
| 4,855,581 | 8/1989 | Mertel et al. | 235/462 |
| 4,857,882 | 8/1989 | Wagner et al. | 340/146.2 |
| 4,862,346 | 8/1989 | Wagner et al. | 364/244 |
| 5,109,353 | 4/1992 | Sample et al. | 364/578 |
| 5,225,832 | 7/1993 | Wang et al. | 341/67 |
| 5,251,321 | 10/1993 | Boothroyd et al. | 341/84 |
| 5,280,349 | 1/1994 | Wang et al. | 341/67 |
| 5,349,350 | 9/1994 | Blagaila | 341/59 |
| 5,384,789 | 1/1995 | Tomita | 371/40.1 |

OTHER PUBLICATIONS

Wakerly, *Digital Design, Principles & Practices*, copyright 1989.

*Primary Examiner*—Kevin J. Teska
*Assistant Examiner*—Tyrone V. Walker
*Attorney, Agent, or Firm*—Whitham, Curtis, Whitham & McGinn; Tiffany Townsend

[57] ABSTRACT

An optimized multiplexer structure reduces the cost in emulation gates in an emulator test system. Extra encoding and decoding logic is added to form a selector with multiple separate subblocks so that the data flow subblock has a reduced input/output (I/O) control path. The circuit reduces the number of control bits from N bits to $\log_2 N$ bits.

7 Claims, 3 Drawing Sheets

OPTIMIZED MULTIPLEXER STRUCTURE FOR EMULATION SYSTEMS

CROSS REFERENCE TO RELATED APPLICATION

The subject matter of the invention disclosed herein is related to that of copending U.S. Pat. application Ser. No. 08/341,775 filed by Eric Hennenhoefer et al. and assigned to a common assignee. The disclosure of application Ser. No. 08/341,775 is incorporated herein by reference.

DESCRIPTION

BACKGROUND OF THE INVENTION

1. Field of the Invention

The present invention generally relates to hardware emulation of circuits and, more particularly, to an optimized multiplexer structure for selectors in microprocessor emulation systems.

2. Background Description

As electronic systems, and in particular microprocessor systems, have become more complex incorporating the parallelism of superscalar architectures, the design and testing of these microprocessors has become more difficult and time consuming. Moreover, prior software simulation techniques have several limitations, including the inability to actually connect a simulation of one part of a design to an actual physical implementation of another part of the design, which make such simulations less than satisfactory for the newer microprocessor architectures.

There has recently been developed hardware simulation systems which aid in the development of complex very large scale integrated (VLSI) circuit designs by quickly and automatically generating a hardware prototype of the VLSI circuit from a schematic or net list. The prototypes are electronically configurable and run at real time or close to real time speed. These hardware emulation systems typically include an emulation array, which is an array of electrically programmable gate arrays (PGAs) used to emulate the necessary logic functions and connect them together into a complete design. The PGAs provide both logic implementation of the simulated devices and signal routing between fixed printed circuit board traces These hardware emulation systems also typically include a data entry workstation where a user can input data representing the circuit or system configuration. This data is then converted to a form suitable for programming the array of PGAs with an interconnected architecture. Few or no manual steps, such as wire wrapping, are required to set up and modify a design. Examples of such systems are to found in U.S. Pat. Nos. 5,109,353 and 5,329,470, both to Sample et al. and assigned to Quickturn Systems, Inc.

A problem exists in current emulator test systems when applied to modern microprocessor designs where each physical PGA uses all its input and output connections while using only a small percentage of its logic functions. In the past, the emulation test system has been adequate for most VLSI circuit designs. However, newer very complex microprocessor designs, particularly the microprocessors implementing the parallelism of superscalar architectures, are requiring more inputs and outputs from the PGA modules.

One example of the new microprocessor designs is the PowerPC® microprocessor. The PowerPC® architecture was jointly developed by International Business Machines Corporation (IBM) and Motorola. The PowerPC® processors are reduced instruction set computer (RISC) processors.

An emulation of the current IBM PowerPC® design achieves less than half utilization of available gates in emulation due to the large amounts of data flow logic. This logic depletes the available interconnections before consuming the logic resources. The largest data flow components in the design are the multiport random access memories (RAMs), which are composed of multiplexers and storage elements, followed by non-RAM multiplexer structures.

In copending application Ser. No. 08/341,775 referenced above, there is disclosed an apparatus and method for partitioning complex multiport RAMs in such a manner that the number of PGAs needed to emulate a particular multiport RAM is reduced to one-half to one-sixth the number needed by prior art systems. In that invention, a partitioning unit divides the multiport RAM into numerous portions or "slices", each of which is capable of being emulated in a single PGA. This invention enhances that invention by providing an optimized multiplexer structure for selectors in microprocessor emulation systems.

SUMMARY OF THE INVENTION

It is therefore an object of the present invention to provide a new multiplexer structure that reduces the cost in emulation gates for providing a hardware emulation of microprocessors.

According to the invention, extra encoding and decoding logic is added to form a selector with two separate subblocks so that the data flow subblock has a reduced input/output (I/O) control path. A significant savings is realized in the case of the PowerPC® microprocessor without having to change the primary I/Os of the multiplexer blocks. The implementation as the added advantage that it is totally transparent to the logic designer.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
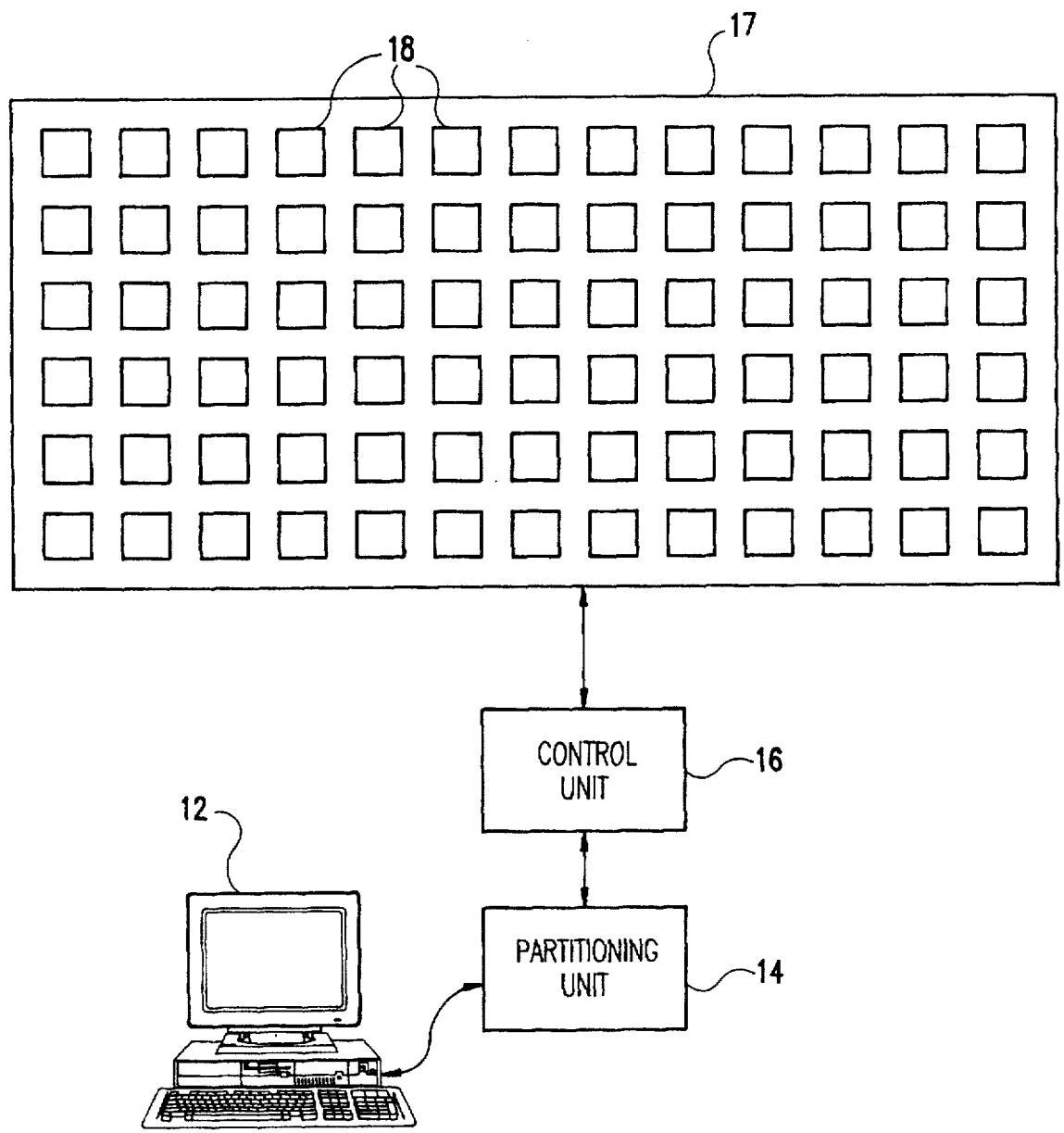
FIG. 1 is a block diagram showing the emulation system of the present invention.

Referring now to the drawings, wherein like reference numerals indicate identical or equivalent components, and more particularly to FIG. 1, there is shown an emulation system 10 according to the present invention and comprising a data entry workstation 12, a partitioning unit 14, a control unit 16, and an emulation array 17. The emulation array is composed of a plurality of programmable gate arrays (PGAs) 18 interconnected as is known in the art. With the exception of the partitioning unit 14, hardware emulation systems having a data entry workstation 12, a control unit 16, and an emulation array 17 of PGAs are known in the art. See for example U.S. Pat. Nos. 5,109,353 and 5,329,470 to Sample et al. cited above. The partitioning unit 14 divides a multiport RAM into numerous portions or "slices", each of which is capable of being emulated in a single PGA, thereby substantially reducing the number of PGAs required for a hardware emulation. For details on the partitioning unit 14, reference may be made to copending U.S. patent application Ser. No. 08/341,775.

Figure 2:
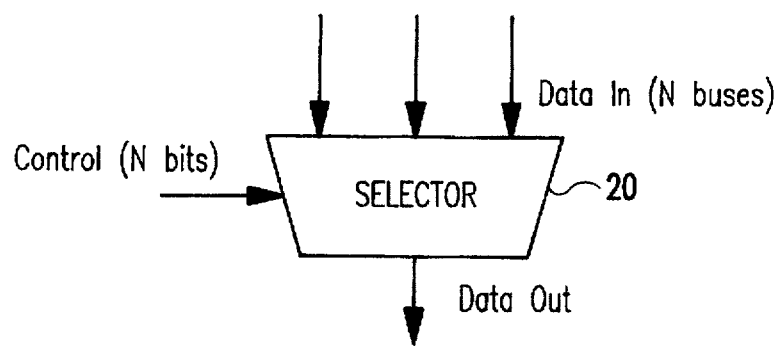
FIG. 2 is a block diagram showing the basic elements of a selector switch.

The present invention is an enhancement to the emulation system shown in FIG. 1 which provides an optimized multiplexer structure that further reduces the cost in emulation gates by 25% to 58%. Before describing the details of the multiplexer structure according to the present invention, a description of a generic multiplexer, or selector, will be helpful in understanding the advantages of the present invention. FIG. 2 shows a selector 20 as a logical switch that connects one of N inputs to one output as a function of a control signal. In the example illustrated, the control bus is N bits wide and only one bit is active at a time. These structures are designed for circuit implementation reasons to minimize the area and cycle time.

Figure 3:
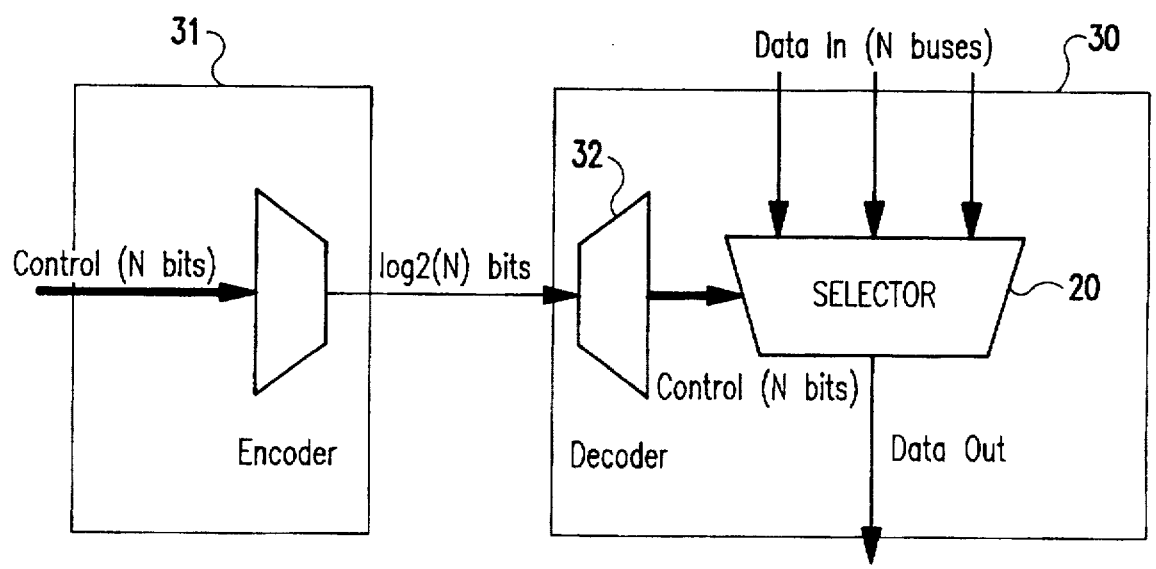
FIG. 3 is a block diagram showing an optimized multiplexer for emulation.

The present invention differs from a normal selector by adding a separate encoder block 31 and combining a decoder block 32 with the selector 20 in a combined selector/decoder block 30, as shown in FIG. 3. The result is a circuit that contains more logic but fewer control bits. In the example, illustrated, the control bits have been reduced from N bits to $\log_2 N$ bits. Emulation systems have a large number of unutilized gates due to the input/output (I/O) limitations; therefore, additional logic is available with little or no cost.

Figure 4:
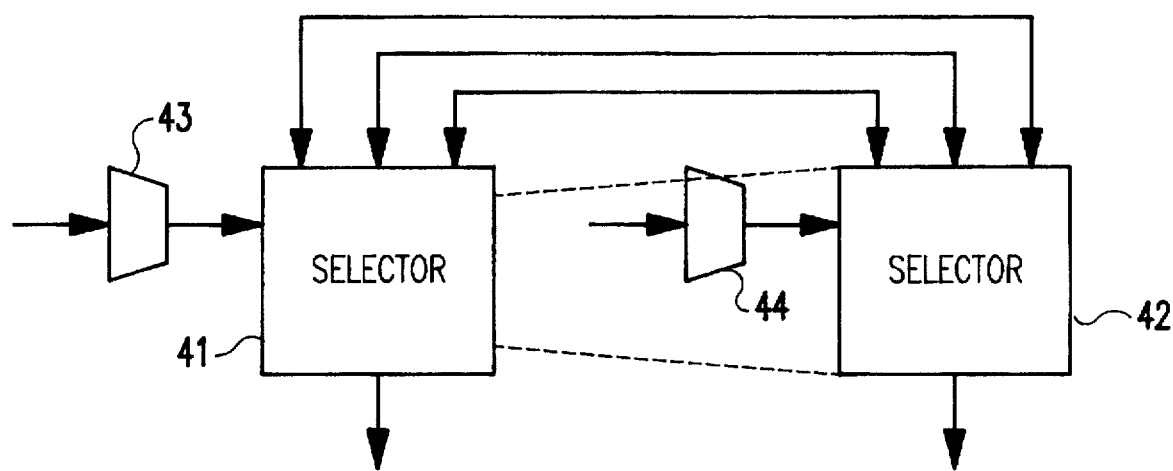
FIG. 4 is a block diagram showing two selectors sharing data inputs.

The reduction of I/Os produces more efficient selectors in terms of I/O utilization which enables an improvement in logic utilization. The logic utilization improvement can be further enhanced, as illustrated in FIG. 4. FIG. 4 illustrates two selector/decoder blocks 41 and 42 sharing data inputs. The structure requires an extra output data bus and an additional control bus. Because of the small amount of internal logic, it is possible to fold a large number of selector/decoder blocks together with the limiting factor being the available I/Os. If, for example, the selector/decoder blocks 41 and 42 in FIG. 4 have twelve data inputs, they will require twelve control inputs. The encoders 43 and 44 reduce the width of each control bus from twelve to four bits, and this savings is multiplied by the number of selectors with common data inputs which, in the example shown in FIG. 4 is two.

Figure 5:
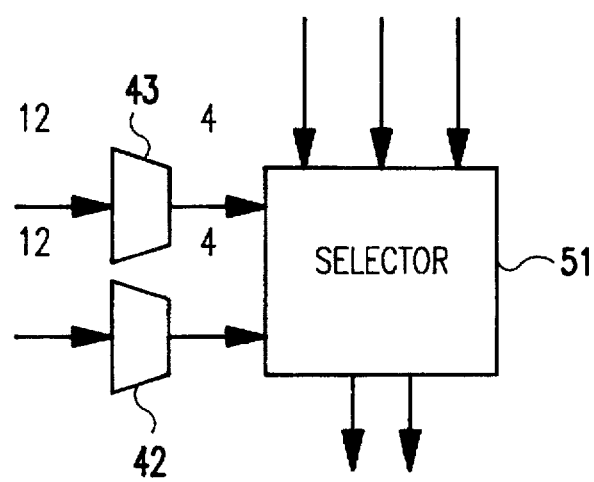
FIG. 5 is a block diagram showing selectors folded together.

FIG. 5 illustrates the resulting structure where the two selector/decoder blocks 41 and 42 are folded into a single selector/decoder block 51 having twelve inputs and two outputs. Using this example, if the structure is folded five times, the original structure of FIG. 2 would require sixty control pins compared to only twenty in the structure according to the invention as illustrated in FIG. 5. Considering that a typical partition in an emulation system is currently limited to one hundred pins, forty fewer pins results in a significantly larger proportion of I/O left for data flow logic.

An emulation partition can be defined as the maximum amount of logic that can fit into the base emulation logic element. In current emulation technology, a partition has a maximum of one hundred I/Os and one thousand gates under this definition. Table 1 shows the capacity requirements for the original selectors. In contrast, Table 2 shows the enhanced capacity requirements of the selectors according to the present invention. Both tables calculate the number of partitions necessary to build ten 64-bit selectors with twelve 64-bit input busses and one 64-bit output bus. Column 1 is the number of instances folded. Taking row 6 of Table 2 as an example, the number of instances folded is six. Column 2 is the number of bits of data, which in the case of row 6 of column 2 is 76. Column 3 is the number of data busses; here, twelve input busses plus six output busses, or 18. Column 4 is the bits per partition. This is calculated as the integer of the number of bits of data, 76, divided by the number of data busses, 18; i.e., int(76/18)=4. Column 5 is the number of folded structures which, for this example, is one plus one of width four. Column 6 is the number of partitions per fold. For a six-way folded selector, there are sixty-four bits and each partition is four bits, thus sixteen partitions are needed (i.e., 64/4). For a four-way folded selector (i.e., 10−6=4), thirteen partitions are required. The total number of partitions in Column 7 is twenty-nine (i.e., 16+13).

TABLE 1

Capacity Requirements for Original Selectors

| Number of instances folded | Available pins for data | Data Busses | Bits per partition | Number of folded structures | Partitions per fold | Total partitions |
|---|---|---|---|---|---|---|
| 1 | 88 | 13 | 6 | 10 | 11 | 110 |
| 2 | 76 | 14 | 5 | 5 | 13 | 65 |
| 3 | 64 | 15 | 4 | 3 + 1 width 1 | 16, 11 | 59 |
| 4 | 52 | 16 | 3 | 2 + 1 width 2 | 22, 13 | 57 |
| 5 | 40 | 17 | 2 | 2 | 32 | 64 |
| 6 | 28 | 18 | 1 | 1 + 1 width 4 | 64, 32 | 86 |
| 7 | 16 | 19 | 0 | — | — | — |

TABLE 2

Capacity Requirements for Invention

| Number of instances folded | Available pins for data | Data Busses | Bits per partition | Number of folded structures | Partitions per fold | Total partitions |
|---|---|---|---|---|---|---|
| 1 | 96 | 13 | 7 | 10 | 9 | 90 |
| 2 | 92 | 14 | 6 | 5 | 11 | 55 |
| 3 | 88 | 15 | 5 | 3 + 1 width 1 | 13, 9 | 48 |
| 4 | 84 | 16 | 5 | 2 + 1 width 2 | 13, 11 | 37 |
| 5 | 80 | 17 | 4 | 2 | 16 | 32 |
| 6 | 76 | 18 | 4 | 1 + 1 width 4 | 16, 13 | 29 |
| 7 | 72 | 19 | 3 | 1 + 1 width 3 | 22, 13 | 35 |
| 8 | 68 | 20 | 3 | 1 + 1 width 2 | 22, 11 | 33 |
| 9 | 64 | 21 | 3 | 1 + 1 width 1 | 22, 9 | 31 |
| 10 | 60 | 22 | 2 | 1 | 32 | 32 |

The usefulness of this invention can be illustrated by way of contrasting examples. Consider ten 64-bit selectors with twelve 64-bit input busses and one 64-bit output bus. All of these ten selectors share the same common input busses. Table 1 shows the number of partitions required to build this structure considering a different number of instances folded together. The minimum number of total partitions, fifty-seven, occurs when four instances are folded together. The improved selector according to the invention is evaluated in Table 2. The best results are achieved when six instances are folded together yielding a total of twenty-nine partitions. This is a significant reduction in resources. Thus, from Tables 1 and 2, the empirical data reveals that a single selector achieves an 18% improvement (eleven partitions reduced to nine), and a 47% improvement is achieved for a group of ten selectors (fifty-seven partitions reduced to twenty-nine).

The final issue concerns the frequency of shared input data selectors. One large set of applications is in the area of multiport RAMs. The remaining set of cases are in the area of switched data buses that are not sourced by memory. A typical area of application is the data path to and from the execution units. The current state of the art in microprocessor design can dispatch in excess of six instructions per cycle. Each instruction dispatched requires zero to three operands of at least sixty-four bits. This forms a selector structure of at least 3×6 selectors with nine or more common inputs. Other smaller examples include data aligners/shifters, multiport content addressable memories (CAMs), and multiport queues.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An optimized multiplexer structure for an emulation system of the type comprising an array of programmable gate arrays (PGAs) controlled to implement the logic and input/output (I/O) functions of a complex logic design, said PGAs including multiplexers controlled externally to select data busses for connection to an output bus, said optimized multiplexer structure comprising:

a plurality of selectors, each selector having a plurality of N-bit input busses and one N-bit output bus and N selector lines for selecting one of said input busses for connection to said output bus;

a plurality of encoders, one for each of the plurality of selectors, said encoders receiving N control signals and outputting $\log_2 N$ encoded control signals; and a plurality of decoders, one for each of the plurality of selectors, said decoders receiving $\log_2 N$ encoded control signals from a corresponding ones of said plurality of encoders and decoding N control signals to select one of the N-bit input busses to pass to said output bus.

2. The optimized multiplexer structure for emulation systems as recited in claim 1 wherein at least some of said selectors share common data inputs, those selectors which share common data inputs being folded together to form a selector having multiple outputs, there being multiple encoders for those selectors which are folded together.

3. The optimized multiplexer structure for emulation systems as recited in claim 2 wherein the number of input busses is twelve.

4. An emulation system for emulating a complex logic design comprising:

a plurality of programmable gate arrays (PGAs) controlled to implement the logic and input/output (I/O) functions of the complex logic design; and a configuration unit electrically coupled to said plurality of PGAs for programming said PGAs to emulate the complex logic design;

each of said PGAs including multiplexers controlled by said configuration unit to select input busses for connection to an output bus, each of said multiplexers including:

a selector having a plurality of N-bit input busses and one N-bit output bus and N selector lines for selecting one of said input busses for connection to said output bus;

an encoder receiving N control signals and outputting $\log_2 N$ encoded control signals; and a decoder receiving $\log_2 N$ encoded control signals from said encoder and decoding N control signals to select one of the N-bit input busses to pass to said output bus.

5. The emulation system for emulating a complex logic design as recited in claim 4 wherein at least some of said selectors share common data inputs, those selectors which share common data inputs being folded together to form a selector having multiple outputs, there being multiple encoders for those selectors which are folded together, said emulation system further comprising a partition unit coupled to said configuration unit for partitioning the complex logic design, there being a predetermined number of partitions per fold of said plurality of selectors.

6. A method of emulating a complex logic design comprising the steps of:

providing a plurality of programmable gate arrays (PGAs), each of said PGAs including a selector having a plurality of N-bit input busses and one N-bit output bus and N selector lines for selecting one of said input busses for connection to said output bus;

programming the PGAs to emulate the complex logic design by generating control signals;

encoding N control signals and outputting $\log_2 N$ encoded control signals; and decoding $\log_2 N$ encoded control signals to N control signals to said selector to select one of the N-bit input busses to pass to said output bus.

7. The method of emulating a complex logic design as recited in claim 6 further comprising the step of folding those selectors which share common data inputs together to form a selector having multiple outputs.

* * * * *